United States Patent [19]
Pradel et al.

[11] Patent Number: 5,441,132
[45] Date of Patent: Aug. 15, 1995

[54] DOUBLE TUBE VIBRATION DAMPER UNIT

[75] Inventors: Robert Pradel, Röthlein-Heidenfeld; Stefan Schiffler, Schonungen-Forst, both of Germany

[73] Assignee: Fichtel & Sachs AG, Schweinfurt, Germany

[21] Appl. No.: 119,477

[22] Filed: Sep. 9, 1993

[30] Foreign Application Priority Data

Sep. 10, 1992 [DE] Germany ............... 42 30 238.2

[51] Int. Cl.⁶ .................. F16F 9/18; F16F 9/36
[52] U.S. Cl. .................. 188/315; 188/322.17
[58] Field of Search ............ 188/276, 322.19, 315, 188/311, 312, 314, 322.14, 322.17, 322.16, 266, 382

[56] References Cited

U.S. PATENT DOCUMENTS

| | | | |
|---|---|---|---|
| 4,185,721 | 1/1980 | Karklins et al. | 188/315 X |
| 4,614,255 | 9/1986 | Morita et al. | 188/315 |
| 4,785,921 | 11/1988 | Hosan et al. | 188/276 X |
| 4,989,701 | 2/1991 | Yamaoka et al. | 188/322.17 |
| 5,277,284 | 1/1994 | Pradel et al. | 188/322.17 |

FOREIGN PATENT DOCUMENTS

| | | |
|---|---|---|
| 0027163 | 4/1981 | European Pat. Off. . |
| 1491251 | 11/1977 | United Kingdom . |
| 2102912 | 2/1983 | United Kingdom ...... 188/322.19 |

*Primary Examiner*—Robert J. Oberleitner
*Assistant Examiner*—Peter M. Poon
*Attorney, Agent, or Firm*—Nils H. Ljungman & Associates

[57] ABSTRACT

A double tube vibration damper comprises a pressure tube and a container tube. Two working chambers are defined by the piston within the pressure tube. A compensation space is provided between the pressure tube and the container tube. The pressure tube extends axially between a bottom wall of the container tube and a piston rod guide secured to the container tube. A spring is in series with the pressure tube between the bottom wall and the piston rod guide. This spring compensates for different length variations of the pressure tube and the container tube. This spring is always under compressional stress throughout the operational range of temperature.

46 Claims, 11 Drawing Sheets

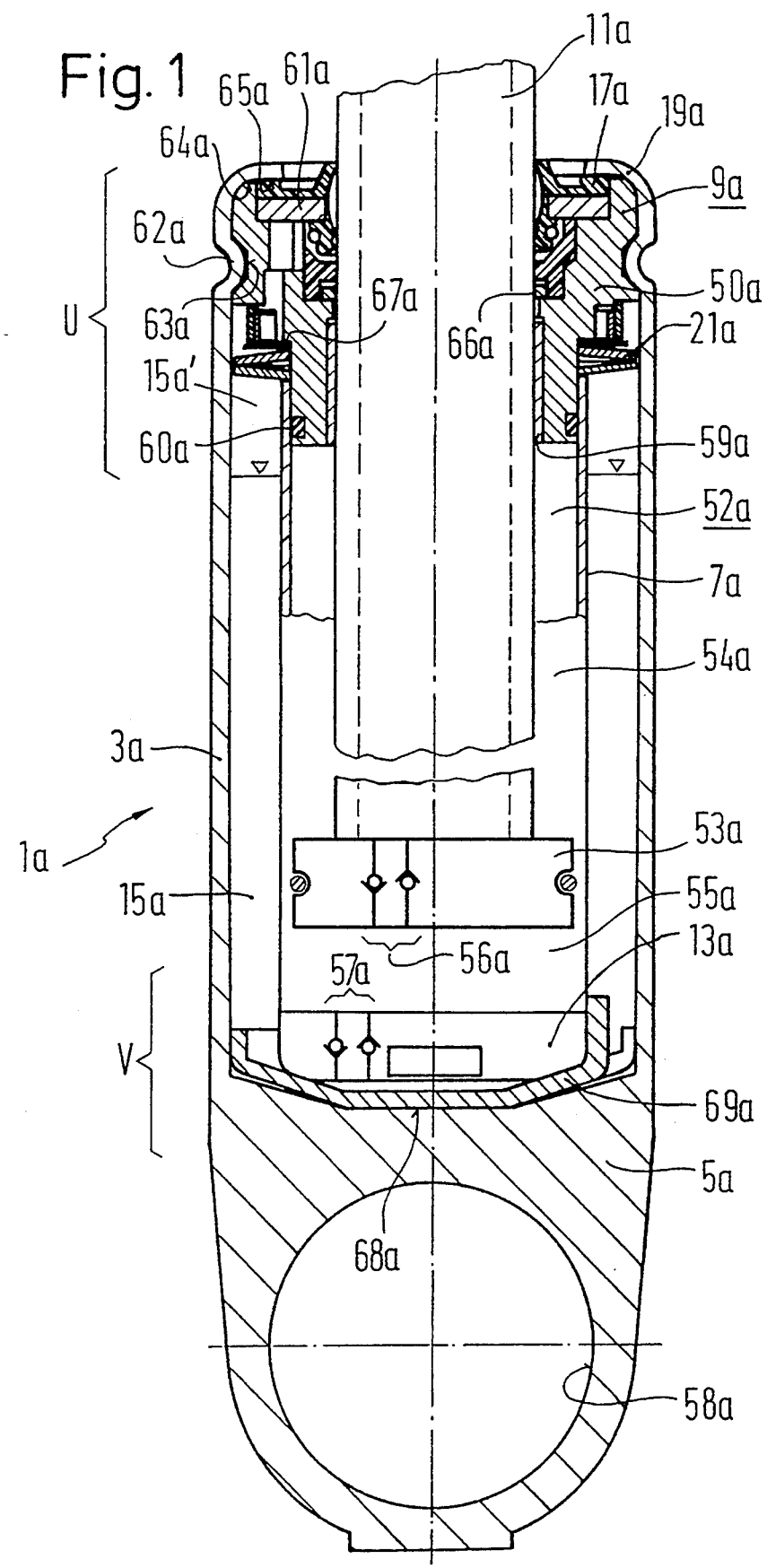

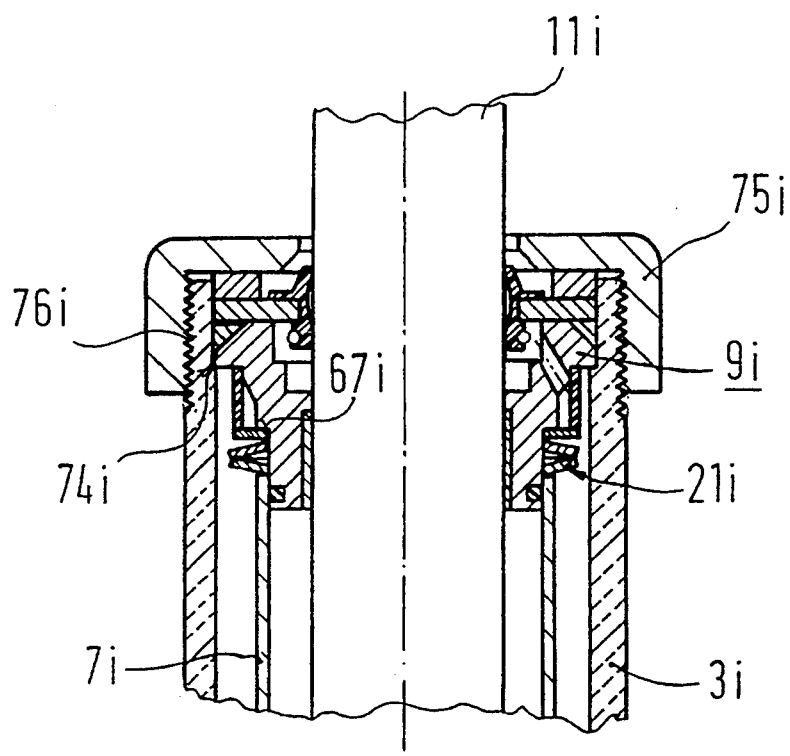

5,441,132

DOUBLE TUBE VIBRATION DAMPER UNIT

BACKGROUND OF THE INVENTION

This invention relates to a vibration damper unit.

The tendency to make vehicle structures lighter has also captured the design of vibration dampers and has more particularly led to making certain components of vibration damper units from plastic material or light metal.

STATEMENT OF THE PRIOR ART

From British Patent 1 491 251, a vibration damper unit is known in which the container tube is made of plastic material. On the other hand, one has been using up to now a steel material for manufacturing the pressure tube of the vibration dampers. When using different materials within the vibration damper unit, one must take care that different length variations of components having different coefficients of thermal expansion are compensated for when the temperature varies within the operational range of temperature of the vibration damper unit. According to the above statements in British Patent 1 491 251, a compensation component is provided in the form of a bellow which forms a longitudinal section of the container tube. It has been found, however, that a container tube made of plastic material is less adapted for being provided with connecting components to which the vehicle axis or steering levers may be connected. It is rather necessary to provide an additional tube which can be provided with such connections.

In view of stability reasons, it is therefore desirable to use a container tube made of metal. When using light metal for manufacturing the container tube, one must consider that the thermal expansion coefficient of aluminium is about twice as great as that of steel. As a consequence thereof, there will arise the problem that in response to temperature increase of the vibration damper unit sealing defects may arise particularly in the area of the piston rod sealing and guiding means. On the other hand, at low temperatures increased stresses occur between the container tube and the pressure tube, because the container tube made of aluminium is subject to considerably stronger shortening. When this stress in response to shortening of the container tube exceeds a certain level, there is the risk that the pressure tube which may be centered by a bottom valve unit is displaced laterally. When the vibration damper unit is a part of a spring strut and transversal forces are introduced, there is a still higher risk of displacement of the pressure tube.

From European Patent 27 163 B1, a further design of a double tube vibration damper is known in which the container tube made of plastic material or an aluminium alloy is combined with a pressure tube made of heavy material such that again different thermal expansions are to be expected. For overcoming this problem, the said European patent proposes to provide a force fit connection between the container tube and the pressure tube by a tension ring with a sealing unit provided inside the compensating space, i.e. between the container tube and the pressure tube.

OBJECT OF THE INVENTION

It is an object of the present invention to provide a design for a double tube vibration damper in which different temperature-responsive length variations of components made of different materials can easily be compensated for.

A further object of the invention is to provide a thermal length variation compensator unit of simple design which can easily be assembled with the other components of the vibration damper unit.

A further object of the invention is to provide compensation of different length variations of a container tube and of a pressure tube such that a lighter material can be used for the container tube, which nevertheless provides sufficient stability for being connected with adjacent components of a wheel suspension.

A further object of the present invention is to avoid influences of differences in thermal expansion of various components on the operational behaviour of a vibration damper unit.

SUMMARY OF THE INVENTION

A double tube vibration damper unit comprises a pressure tube member having an axis and axially extending between a first terminal area thereof and a second terminal area thereof with a cavity being defined inside the pressure tube member axially between the first terminal area and the second terminal area. Annular guiding and sealing means are provided within the first terminal area. A piston rod member is axially guided through the annular guiding and sealing means inward and outward of the cavity. A piston unit is connected to the piston rod member inside the cavity. This piston unit separates within the cavity two working chambers from each other, namely a first working chamber nearer to the first terminal area and a second working chamber nearer to the second terminal area. The first and second working chambers are interconnectable with each other for damping fluid flow through piston bridging valve means. The second working chamber is confined adjacent the second terminal area by a bottom valve unit. The pressure tube member is surrounded by a container tube member substantially coaxial with the pressure tube member and axially extending between the first terminal area and the second terminal area. A compensation space is confined radially between the pressure tube member and the container tube member. The second working chamber and the compensation space are interconnectable with each other for damping fluid flow through bottom valve means of the bottom valve unit. The annular guiding and sealing means comprise an annular supporting unit which is adapted for axially supporting the pressure tube member and the container tube member with respect to each other. The container tube member is provided with a bottom unit in the second terminal area. This bottom unit is adapted for axially supporting the pressure tube member and the container tube member with respect to each other. The annular supporting unit is axially secured with respect to the container tube member in at least one axial direction against movement with respect to the container tube member and is provided with first pressure tube supporting means. The bottom unit is axially secured with respect to the container tube member in at least one axial direction against movement with respect to the container tube member and is provided with second pressure tube supporting means. The pressure tube member is arranged in a series arrangement with at least one thermal length variation compensator unit. This series arrangement is axially located between both the first and second pressure tube supporting means. The series arrangement is under axial stress of constant direction within a predetermined operational range of temperature.

The range of temperature depends upon the environmental and operational conditions which are to be expected for the vibration damper unit. The highest temperatures to be expected are those which occur when on the one hand a high ambient temperature exists and on the other hand the vibration damper unit has to dissipate a high amount of energy by damping work, e.g. on a rough driving surface. The lowest temperatures occur during standstill of the motor vehicle when no damping work is effected, e.g. in arctic areas in winter.

The design principle of the present invention procures an axial stress in a constant predetermined prestress direction such that the position of the pressure tube within the vibration damper unit is always well defined. On the other hand, there is always a possibility for compensation of different length variations at all operational temperatures to be expected. The maximum stress within the vibration damper unit and more particularly within the pressure tube can be limited by the design of the at least one thermal length variation compensator unit. Excess stresses and lateral displacement of the pressure tube with respect to the container are avoided.

The first and second pressure tube supporting means are generally oppositely directed towards each other such that the axial stress is a compressional stress with respect to the series arrangement. Within the series arrangement there is always a compressional stress.

The annular supporting unit may be an annular supporting and centering unit which fulfills the function of centering the pressure tube member with respect to the container tube member.

The bottom unit may be adapted for both axially supporting and radially centering the pressure tube member with respect to the container tube member.

Most preferably, the annular supporting and centering unit may be adapted for centering the piston rod member with respect to both the pressure tube member and the container tube member.

So, it is possible that the annular supporting unit comprises an annular supporting and centering body adapted for centering the pressure tube member, the container tube member and the piston rod member with respect to each other. This results in an embodiment with a minimum number of components which can be assembled most easily. The annular supporting unit may carry sealing means for sealing the first working chamber and sealing means for sealing the compensation space.

The pressure tube member may be adjacent the first terminal area in an axially overlapping relationship with a circumferential face of the supporting unit. In this case, a sealing ring member may be provided with a circumferential centering face such that the sealing ring member is sealingly engaged with the pressure tube member.

In such an embodiment, there is only very little and very slow relative movement, if any, between the pressure tube member and the sealing ring member thanks to the well defined positioning of the pressure tube member within the unit. The sealing function is warranted under all operational conditions within the predetermined range of operational conditions and on the other hand wear of the sealing faces is small even after long operation periods.

In accordance with the prior art as shown e.g. in the British specification 1 491 251, the pressure tube may be axially supported by the bottom unit through a force transmitting portion of the valve unit. This force transmitting portion becomes a part of the afore-mentioned series arrangement. This embodiment has the advantage that it provides an automatic positioning of the bottom valve unit when positioning the pressure tube member. It is however not intended to exclude the possibility of positioning the bottom valve unit separately inside the pressure tube member and of supporting the pressure tube member directly on the bottom unit of the container tube.

While it is generally sufficient to provide one or more of said thermal length variation compensator units in said series arrangement between the first and second pressure tube supporting means, further advantages particularly in assembling may be obtained by providing a further thermal length variation compensator unit in series or as a part of the container tube member. Assuming that at least one thermal length variation compensator unit within the above-mentioned series arrangement is always under compressional stress, the further thermal length variation compensator unit in series or integrated with the container tube member will consequently always be under tractional stress.

The further thermal length variation compensator unit may be provided by at least one circumferential fold structure of the container tube member. Preferably, the fold structure is a radially inwardly directed waveshaped fold structure. The thermal length variation compensator unit may be provided adjacent the first terminal area in the said series arrangement.

Alternatively, the thermal length variation compensator unit can be provided adjacent the second terminal area within said series arrangement.

The pressure tube member and the container tube member may be made of materials having widely different coefficients of thermal expansion. For example, the pressure tube member may be made of steel whereas the container tube member may be made of aluminium or aluminium alloys. Also further components of the vibration damper unit may be made of materials with different thermal expansion coefficients. The use of a steel made pressure tube member and a light metal made container tube member has the consequence that at increased operational temperatures the light metal made container tube member is considerably more lengthened than the steel made pressure tube. As a result thereof, the compressional stress of the thermal length variation compensator unit is reduced at increasing temperatures and is increased at decreasing temperatures. The resiliency, the admissible path of resilient compensation movement and the axial stress of the thermal length variation compensator unit are therefore selected such that under all working conditions within the above-defined range of working temperatures a compressional axial stress of the compensator unit is maintained and on the other hand the compressional stress never exceeds a predetermined maximum value at low temperatures.

As a matter of example, the thermal length variation compensator unit may comprise at least one cup spring and preferably at least one pair of cup springs. The cup springs of this at least one pair of cup springs have radially inner edges spaced axially from each other. One of these radially inner edges may act against a first end of the pressure tube member, whereas the radially inner edge of the other cup spring may act against the axial supporting unit of the annular guiding and sealing means.

Alternatively, the thermal length variation compensator unit may comprise an annular compensator body having a axial width variable in response to temperature. The width variation of the annular compensator body may be related to different coefficients of thermal length variation of the pressure tube member and the container tube member such that within the predetermined operational range of temperature a difference of length variation between the pressure tube member and the container tube member is approximately compensated for by variation of the axial width of the annular compensator body.

Nevertheless, the annular compensator body is preferably made of an elastic and more preferably of an elastomeric material.

For well defining the thermal width expansion of the thermal expansion body at varying temperatures and for preventing flowing deformation of this body, the annular compensator body is limited in radial dimension by radial confining means.

For example, the annular compensator body may be located axially between a first end of the pressure tube member and the first pressure tube supporting means. The first pressure tube supporting means may be provided by a substantially radially extending shoulder face of the annular supporting unit. This shoulder face may be provided with an annular recess. The annular compensator body is then partially received by the annular recess and acts onto the first end of the pressure tube member through an annular force transmission disc.

Alternatively, the annular compensator body may be accommodated within a substantially L-shaped confining ring member which has a bottom portion included within the series arrangement and a wall portion radially adjacent to the annular compensator body.

Thus, the annular compensator body may be positioned in axial direction between the bottom portion which is axially adjacent the first end of the pressure tube member and an annular force transmitting disc axially supported by the first pressure tube supporting means.

The container tube member may be axially fixed with respect to the annular supporting unit in opposing axial directions. This is an interesting aspect, because by such fixing in opposite axial direction all possible components of the first axial supporting unit including possible sealing means for the first working chamber and for the compensation space may be positively secured with respect to each other.

When the annular guiding and sealing means comprise an annular supporting and centering body, this annular supporting and centering body may be provided with a circumferential face and a terminal face remote from the cavity. Then, the securing of the container tube member with respect to this annular supporting and centering body in both axial directions may be obtained as follows: A continuation of the container tube member extending beyond the terminal face is bent radially inwards and applied to said terminal face, whereas a section of the container tube member adjacent to the circumferential face of the supporting and centering body is brought to bead engagement with the circumferential face of the annular supporting and centering body. Thus, a piston rod sealing unit may be clamped with respect to the annular supporting and centering body between the bead engagement zone and the bent continuation of the container tube member applied against the terminal face of the annular supporting and centering body.

A further possibility of axially securing the annular supporting unit with respect to the container tube member in two opposite axial directions is as follows: The annular supporting unit comprises an annular supporting and centering body. The annular supporting and centering body is in engagement with an internal shoulder face of the container tube member, which shoulder face is substantially axially directed away from the cavity. A screw cap is screwed onto a first end portion of the container tube member. This screw cap has a circumferential wall in threaded engagement with external thread means of the container tube member and an end wall overlying a terminal face of the annular supporting and centering body remote from the cavity.

As mentioned above, the thermal length variation compensator unit may be provided also within the second terminal area. Thus, the pressure tube member may be supported on the second pressure tube supporting means through the at least one thermal length variation compensator unit. In this case, the thermal length variation compensator unit may comprise a centering plate member. This centering plate member may have a central zone supported by the second pressure tube supporting means and may further have a peripheral zone axially resilient with respect to the central zone. Then, the pressure tube member may be resiliently supported in axial direction. Again, the pressure tube member may be supported by the peripheral zone through the bottom valve unit.

For maintaining an axial stress of predetermined minimum value and not exceeding a predetermined maximum value, it is desirable that the peripheral zone is within the operational range of temperature free of axial support by the bottom unit and the pressure tube member is within the operational range of temperature free of axial support by the central zone.

The centering plate member may fulfill its centering function as follows: The peripheral zone is provided alternatingly with centering flaps for centering the pressure tube member with respect to the centering plate member and with lateral positioning flaps for centering the centering plate member with respect to the container tube member.

A further possibility of allocating the centering function to the centering plate member is as follows: The peripheral zone is provided with angularly spaced centering flaps for centering the pressure tube member with respect to the centering plate member. These centering flaps are provided with radially outwardly directed continuations for centering the centering plate member with respect to the container tube member.

The resilient behaviour of the centering plate member acting as a thermal length variation compensator unit may be obtained or modified as follows: The peripheral zone is provided with lateral extensions which are supported by spring means or additional spring means.

Particularly but not exclusively in cases in which a thermal length variation compensator unit is provided only adjacent the first terminal area, the bottom unit of the container tube member may be provided with centering cam means for centering the pressure tube member with respect to the container tube member. Again, these centering cams may act indirectly onto the container tube member by engaging the bottom valve unit when the bottom valve unit is radially centered with respect to the container tube member.

As an alternative to the above-discussed solution according to which a piston rod sealing unit is positioned with respect to an annular supporting and centering body by positively securing the container tube member in both axial directions with respect to the annular supporting and centering body and clamping thereby the piston rod sealing unit towards the annular supporting and centering body, there exists also the further possibility that the axial stress provided by the at least one thermal length variation compensator unit is responsible for maintaining the sealing function of the annular guiding and sealing means. In such cases, the minimum value must be such that the sealing condition is maintained throughout the predetermined operational range of temperature.

The method for assembling the vibration damper unit as discussed at the beginning of the summary may comprise: Axially adjusting by an external adjusting force the annular supporting unit with respect to the container tube member against a resilient action of the thermal length variation compensator unit until achieving an axial boundary position of the annular supporting unit with respect to the container tube member corresponding to a maximum axial stress of the thermal length variation compensator unit, allowing the annular supporting unit to return from the axial boundary position towards a securing position with respect to the container tube member, said securing position being spaced from the boundary position by a predetermined return path value, and thereupon securing the annular supporting unit with respect to the container tube member.

This method is of particular interest if no further length variation compensator unit is provided in series or integrated within the container tube member.

On the other hand, in cases in which the container tube member is provided with a circumferential lengthening fold which allows in operation resilient axial lengthening of the container tube member after the at least one thermal length variation compensator unit has been stressed to a maximum value, the assembling method may comprise axially adjusting by an external adjusting force the annular supporting unit with respect to the container tube member against a resilient action of the thermal length variation compensator unit achieving an axial boundary position of the annular supporting unit with respect to the container tube member corresponding to a maximum axial stress of the thermal length variation compensator unit, and thereupon securing the annular supporting unit with respect to the container tube member.

In both methods, the securing may be performed by bending an end portion of the container tube member into engagement with a terminal face of the annular supporting unit and providing a bead engagement between the container tube member and a circumferential face of the annular supporting unit.

Further features of the invention may be seen within the attached claims which form a part of the disclosure.

BRIEF DESCRIPTION OF THE DRAWINGS

The invention will be described further with reference to the attached drawings in which:

FIG. 1 shows in a longitudinal section a complete vibration damper unit according to the present invention;

FIG. 2b shows a detail of the device according to FIG. 2a, said detail being located at the location IIb of FIG. 2a;

FIG. 3a shows a still further embodiment similar to the embodiment of FIG. 2a;

FIG. 3b shows a detail of the embodiment of FIG. 3a at a location indicated by IIIb of FIG. 3a;

FIG. 4b shows a plan view on a centering plate member of the embodiment of FIG. 4a seen in direction IVb of FIG. 4a;

FIG. 5b shows a plan view of the centering plate member of FIG. 5a as seen in direction of arrow Vb of FIG. 5a;

FIG. 10 shows a still further embodiment similar to the embodiment of FIG. 2a;

FIG. 11b shows a section according to line XIb—XIb of FIG. 11a.

DETAILED DESCRIPTION OF THE PREFERRED EMBODIMENTS

Figure 2A:
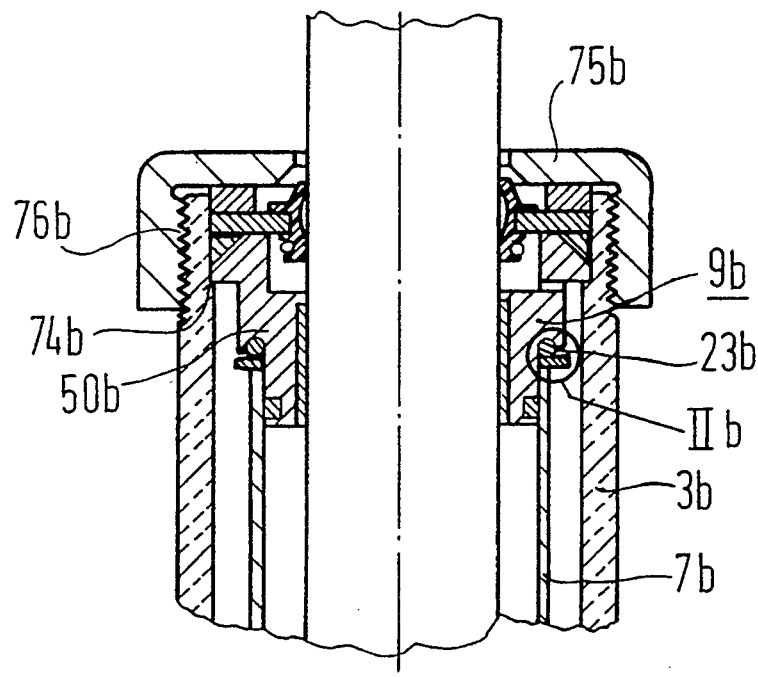
FIG. 2a shows a longitudinal section with a further embodiment adjacent an upper terminal area of the vibration damper unit.

FIG. 1 shows a double tube vibration damping unit 1a comprising a container tube 3a and a pressure tube 7a. Piston rod guiding and sealing means 9a are provided in an upper terminal area U. These piston rod guiding and sealing means 9a comprise an annular supporting and centering body 50a. A piston rod 11a is introduced through the piston rod guiding and sealing means 9a into a cavity 52a provided inside the pressure tube 7a. The piston rod 11a is connected with a piston unit 53a inside the cavity 52a which separates the cavity 52a into a first working chamber 54a and a second working chamber 55a. A compensation space 15a is confined radially between the pressure tube 7a and the container tube 3a. A bottom valve unit 13a is provided at the lower end of the second working chamber 55a in the lower terminal area V. The piston unit 53a is provided with piston valve means 56a which interconnect the working chambers 54a and 55a. The bottom valve unit is provided with bottom valve means 57a which connect the lower working chamber 55a and the compensation space 15a. The container tube member 3a is integrally provided with a bottom unit 5a. In the bottom unit 5a there is provided a fastening eye 58a by which the vibration damper unit 1a may be connected to a wheel unit of a motor vehicle, whereas the upper end of the piston rod 11a (not shown) may be provided with a similar fastening eye for being connected to the cabin of a motor vehicle. The working chambers 54a and 55a are filled with a damping liquid, preferably with a damping oil. The lower part of the compensation space 15a also contains a damping oil, whereas the upper portion 15a' of the compensation space 15a contains a volume of gas which may be under superatmospheric pressure. In operation, the piston rod 11a with the piston unit 53a moves inwards and outwards of the cavity 52a. On inward movement of the piston rod 11a, damping oil is expelled from the working chamber 55a towards the working chamber 54a and towards the compensation space 15a; on outward movement of the piston rod 11a, damping liquid is expelled from the working chamber 54a towards the working chamber 55a and further damping oil enters from the compensation space 15a through the bottom valve means 57a towards the working chamber 55a. In both phases of operation, the movement of the piston rod 11a with respect to the pressure tube 7a may be damped by respective design of the piston valve means 56a and the bottom valve means 57a, as is well known in the art. The piston rod 11a is guided within the annular supporting and centering body 50a by a guiding and sealing sleeve 59a. The annular supporting and centering body 50a is sealed with respect to the pressure tube 7a by a sealing ring 60a. The annular supporting and centering body 50a is sealed with respect to the piston rod 11a by a sealing unit 17a which is reinforced by an annular reinforcement disc 61a. The annular supporting and centering body 50a is fixed with respect to the container tube 3a by a bead 62a engaged in a circumferential groove 63a of the annular supporting and centering body 50a and by a radially inwardly bent continuation 19a of the container tube 3a which is axially applied towards a terminal face 64a of the annular supporting and centering body 50a and a terminal face 65a of the piston rod sealing unit 17a.

An annular check valve member 66a which is well known in the art is provided between the piston rod 11a and the annular supporting and centering body 50a.

The annular supporting and centering body 50a is axially fixed in both axial directions with respect to the container tube 3a. The pressure tube 7a is axially resiliently supported by a shoulder face 67a through a pair of cup springs 21a and by an axially directed central supporting face 68a of the bottom unit 5a through a centering plate 69a. The pair of cup springs 21a, the pressure tube 7a, the bottom valve unit 13a, and the centering plate 69a form an axially compressible series arrangement 21a, 7a, 13a, 69a which is under axial compressional stress between the shoulder face 67a and the central supporting face 68a. The pressure tube 7a is centered with respect to the container tube 3a by the annular supporting and centering body 50a and by the bottom valve unit 13a and the centering plate 69a. The piston rod 11a is centered with respect to the annular supporting and centering body 50a. The piston rod sealing unit 17a is in sealing engagement with both the piston rod 11a and the annular supporting and centering body 50a. The bead portion 62a is in sealing engagement with the annular supporting and centering body 50a.

The pressure tube 7a is made of steel, whereas the container tube 3a is made of aluminium. In operation, the vibration damper unit is subject to considerable temperature variations which result from ambient temperature and from energy dissipation within the vibration damper unit. The pressure tube 7a and the container tube 3a have different coefficients of thermal expansion. On increase of temperature, the container tube 3a is lengthened more than the pressure tube 7a with the result that the compressional stress within the series arrangement 21a, 7a, 13a, 69a is reduced. On decrease of temperature, the container tube 3a is shortened more than the pressure tube 7a with the result that the compressional stress within the series arrangement 21a, 7a, 13a, 69a is increased. Without consideration of resiliency of the centering plate 69a which will be described later, the spring cups 21 are compressionally stressed at normal temperature of e.g. 20° C. such that both at the upper limit of the operational temperature range and at the lower limit of the operational temperature range the cup springs 21a are under compressional stress. This compressional stress is at a maximum at the lower limit of the operational range of temperature and is at a minimum at the upper limit of the operational range of temperature. Thus, the axial position of the pressure tube 7a with respect to the container tube 3a and with respect to the annular supporting and centering body 50a is always under control. Moreover, it is to be noted that the piston rod sealing unit 17a is always axially fixed with respect to the annular supporting and centering body 50a by the section of the container tube 3a extending between the bead 62a and the radially inwardly bent continuation 19a. Thus, in spite of considerable temperature variations, the sealing functions of the sealing ring 60a, of the piston rod sealing means 17a and of further sealing means (not shown) which may be provided between the bottom valve unit 13a and the lower end of the pressure tube 7a are always warranted in the total range of operational temperature.

Figure 7:
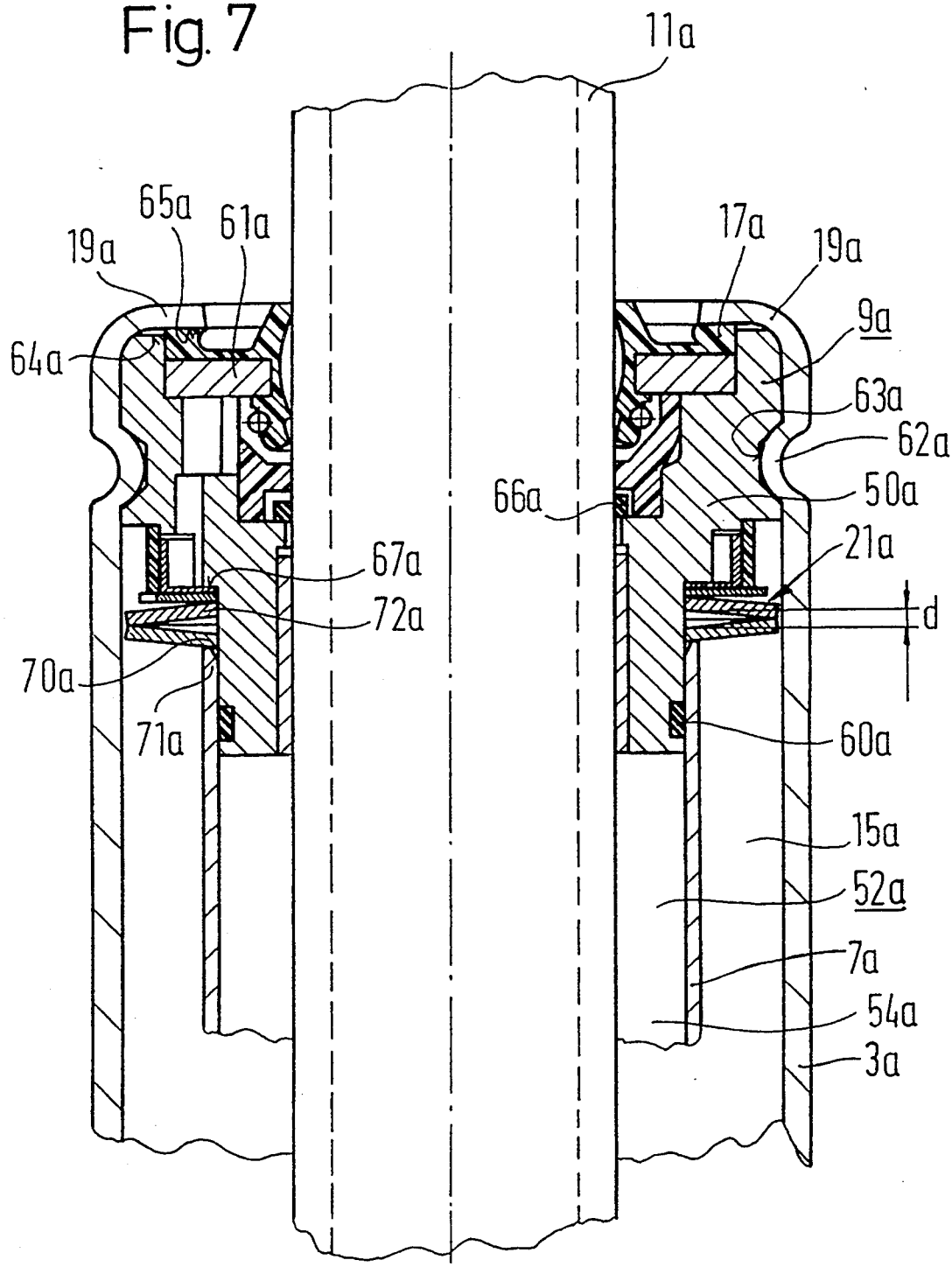
FIG. 7 shows in an enlarged scale the upper portion of the double tube vibration damper of FIG. 1.

FIG. 7 shows the upper portion of the vibration damper unit of FIG. 1 in more detail. One again recognizes the pair of cup springs 21a which may be replaced by a plurality of such pairs of cup springs. The radially inner edge 70a of the lower cup spring 21a is in axial engagement with an upper end 71a of the pressure tube 7a, whereas the radially inner edge 72a of the upper cup spring of the pair of cup springs 21a is in engagement with a shoulder face 67a of the annular supporting and centering body 50a.

FIGS. 1 and 7 show the vibration damper unit at a normal temperature value of e.g. 20° C. which is assumed now to be the temperature at which assembling is made. When assembling the vibration damper unit of FIGS. 1 and 7, all components thereof are brought into a position as shown in FIG. 7. In this pre-assembling status, the continuation 19a of the container tube 3a is still axially directed in upward alignment with the lower section of the container tube 3a. Moreover, the bead 62a does not yet exist. In this pre-assembling status, the axial distance d as shown in FIG. 7 between the radially inner edges 70a, 72a of the cup springs 21a is larger than shown in FIGS. 1 and 7.

Now, the annular supporting and centering body 50a and the bottom unit 5a are clamped between clamping faces of a clamping unit until the distance d becomes zero. In this phase of the assembling operation, the compressional stress within the series arrangement 21a, 7a, 13a, 69a is at a maximum. One can sense achievement of the zero value of the axial distance d corresponding to the maximum compressional stress within the series arrangement by a sudden increase of the clamping force applied to the above-mentioned clamping faces during the mutual approach of said clamping faces. Thus, one can avoid the unintended non-elastic compression of the pressure tube 7a. As soon as the zero value of the axial distance d has been achieved, the mutual approach of the clamping faces of the clamping unit is stopped and the clamping faces are removed from each other by a predetermined path corresponding to the axial distance d, as shown in FIG. 7. This predetermined path is memorized in the control unit of the clamping unit. After the axial distance has thus obtained the value d as shown in FIG. 7, the bead 62a is shaped into the corresponding groove 63a and the continuation 19a of the container tube 3a is radially inwardly bent into the position as shown in FIGS. 1 and 7. Now, a predetermined compressional stress is obtained within the series arrangement 21a, 7a, 13a, 69a. This compressional stress is exactly defined by the distance d resulting from the mutual distancing of the clamping faces. The compressional stress is selected such that within the predetermined operational range of temperature one can increase the temperature up to the upper limit of said range of temperature with the distance d being also increased. During this increase of the distance d, the compressional stress is decreased. There exists however a compressional stress still even at the upper temperature limit of the operational range of temperature. At a decrease of the operational temperature below the assembling value thereof, the container tube 3a is shortened more than the pressure tube 7a. Therefore, the radially inner edges 70a and 72a approach each other and the compressional stress of the series arrangement is increased. However, even at the lower limit of the temperature range there exists still an axial distance between the radially inner edges 70a and 72a. Therefore, no locking condition of the cup springs 21a can occur and no excess compressional load can occur within the pressure tube 7a. So, the pressure tube 7a cannot be displaced laterally.

In the embodiment as shown in FIG. 2a, the annular supporting and centering body 50b is axially supported by a shoulder face 74b of the container tube 3b. The axial supporting and centering body 50b is axially secured with respect to the container tube 3b by a cap member 75b which is in screw engagement at 76b with the container tube 3b. Thus, the annular supporting and centering body 50b is again axially fixed in both axial directions with respect to the container tube 3b.

Figure 2B:
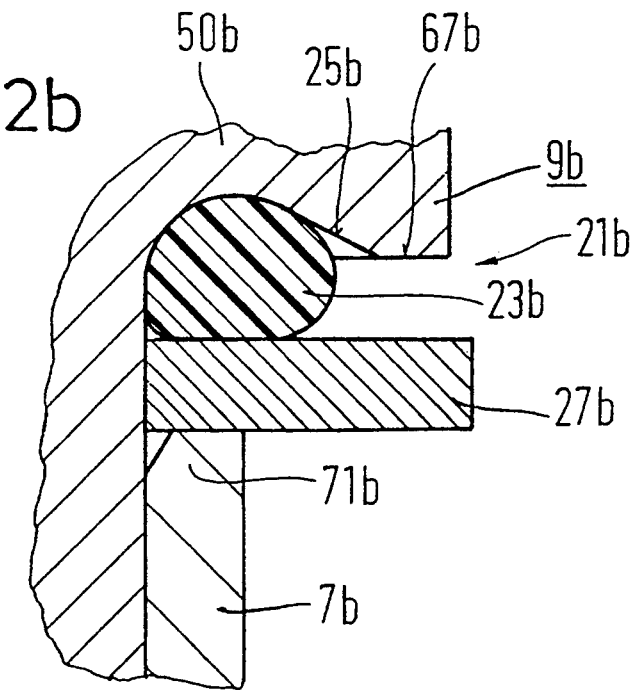

As one can see from FIG. 2b, on the upper end 71b of the pressure tube 7b there is located a supporting disc 27b. An elastic thermal expansion body 23b is located between the supporting disc 27b and an annular recess 25b provided within a supporting surface 67b of the annular supporting and centering body 50b. So, the elastic thermal expansion body 23b is confined also in radial direction. The thermal expansion coefficient of the thermal expansion body 23b is such that the sum of the length variation of the pressure tube 7b and the thickness variation of the thermal expansion body 23b corresponds substantially to the length variation of the container tube 3b. The thermal expansion body 23b is under a predetermined compressional stress which is determined by the assembling operation, i.e. by the application of the screw cap member 75b. It is to be noted, however, that the compressional stress remains substantially constant throughout the operational temperature range. It is needless to say that when selecting the axial width of the thermal expansion body 23b one must not only consider the thermal expansion coefficients of the pressure tube 7b, the container tube 3b and the thermal expansion body 23b but also the absolute axial lengths of the tubes 3b and 7b.

Figure 3A:
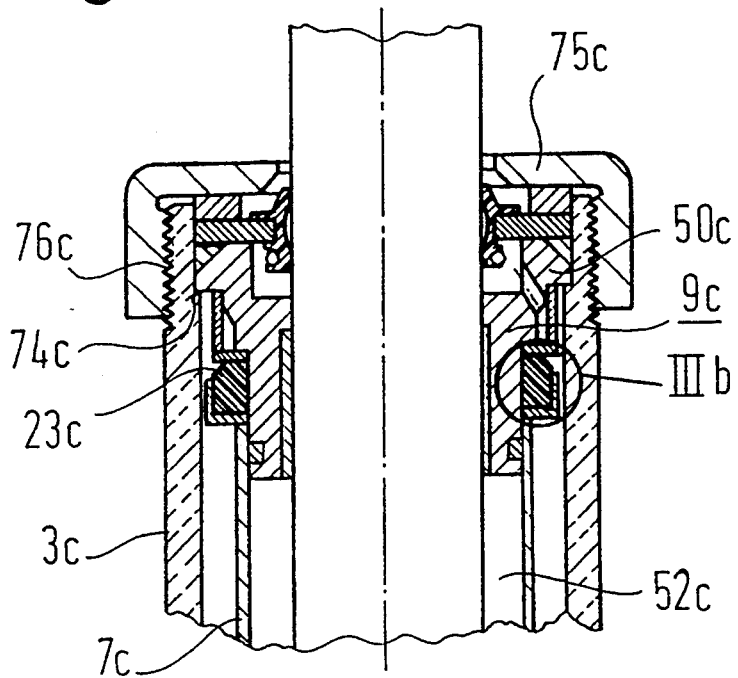
Figure 3B:
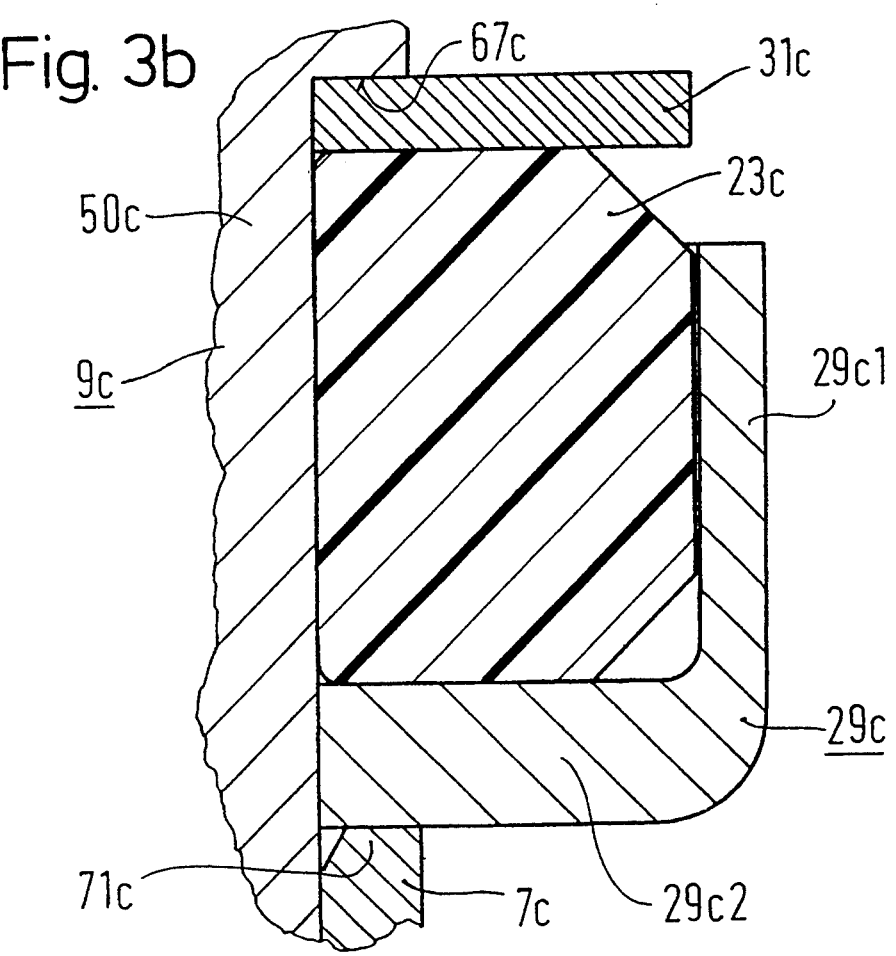

The embodiment of FIGS. 3a and 3b differs from the embodiment of FIGS. 2a and 2b only by a different design and arrangement of the thermal expansion body 23c. An L-shaped confining ring 29c has a bottom portion 29c2 and a lateral confining portion 29c1. The bottom portion 29c2 abuts against the first or upper end 71c of the pressure tube 7c. A support disc 31c is axially supported by the shoulder face 67c of the annular supporting and centering body 50c.

Figure 4A:
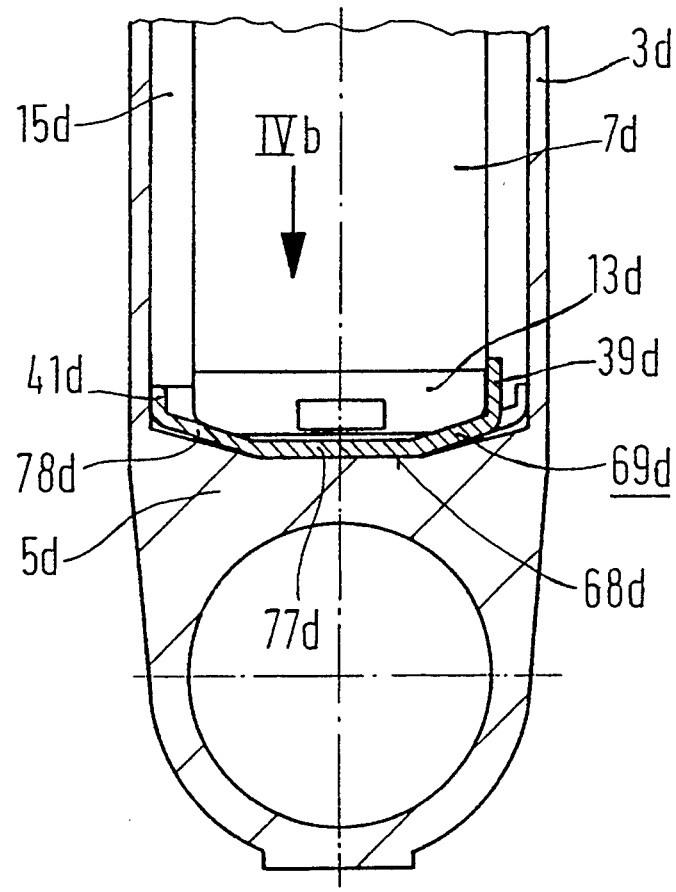
FIG. 4a shows a still further embodiment with a compensator unit being located in a lower terminal area of the unit.
Figure 4B:
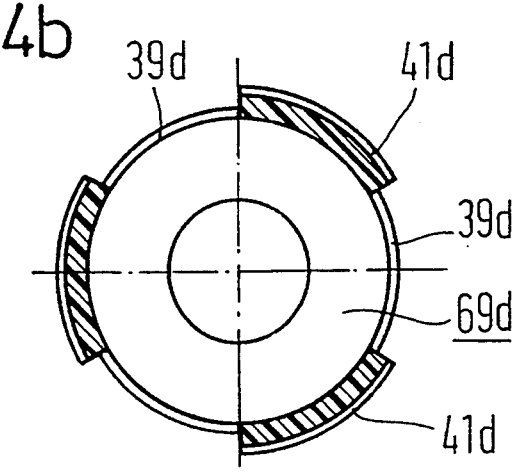

The embodiment of FIGS. 4a and 4b corresponds to the lower portion of FIG. 1. One recognizes again that the pressure tube 7d is axially supported through the bottom valve unit 13d and the centering plate 69d on the central support face 68d of the bottom unit 5d. The centering plate 69d is pan-shaped and has a central portion 77d in engagement with the central support face 68d and a peripheral portion 78d which is spaced from the axially opposite face of the bottom unit 5d. Thus, this peripheral portion 78d is axially resilient with respect to the central portion 77d when the central portion 77d is in contact with the central support face 68d. The bottom valve unit 13d is in axial engagement only with the peripheral portion 78d, whereas the central portion of the bottom valve unit 13d has axial distance from the central portion 77d. Thus, the pressure tube 7d can be urged against elastic resistance downwards towards the central support face 68d. The pan-shaped central plate 69d is provided with radially inner centering flaps 39d centering the bottom valve unit 13d with respect to the centering plate 69d. Moreover, the centering plate 69d is provided with radially outer flaps 41d which center the centering plate 69d with respect to the inner circumferential face of the container tube 3d in the lower area of the bottom unit 5d. One can see from FIGS. 4a and 4b that the flaps 39d and 41d are arranged alternatingly about the axis of the centering plate 69d.

The centering plate 69d can fulfill the function of a thermal length variation compensator unit as the pair of cup springs 21a or the thermal expansion body 23b or the thermal expansion body 23c do. The centering plate 69d can be the only thermal length variation compensator unit. It can however also be combined with a thermal length variation compensator unit provided at the upper end of the pressure tube 7d as shown in FIGS. 1, 2a–2b, 3a–3b and 7.

The cross-hatched areas in FIG. 4b show the passages through which damping liquid can flow from the lower working chamber through the bottom valve unit 13d and the centering plate 69d into the compensation space 15d.

Figure 5A:
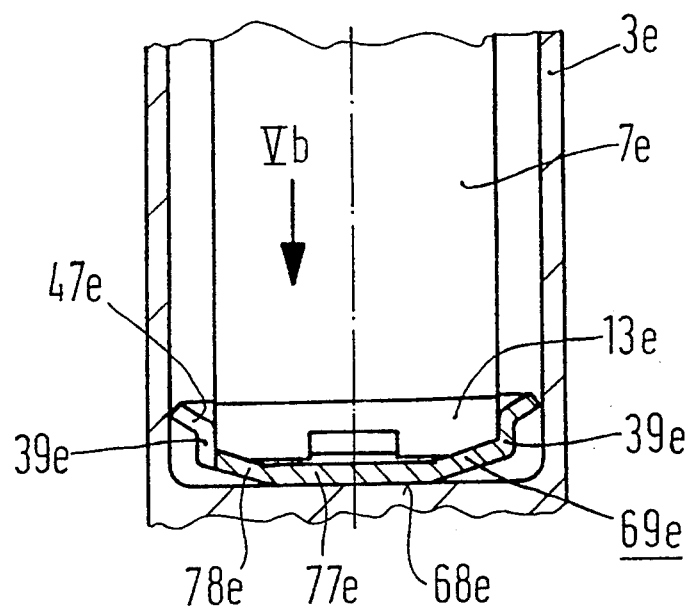
FIG. 5a shows a still further embodiment similar to the embodiment of FIG. 4a with a modified centering plate member.
Figure 5B:
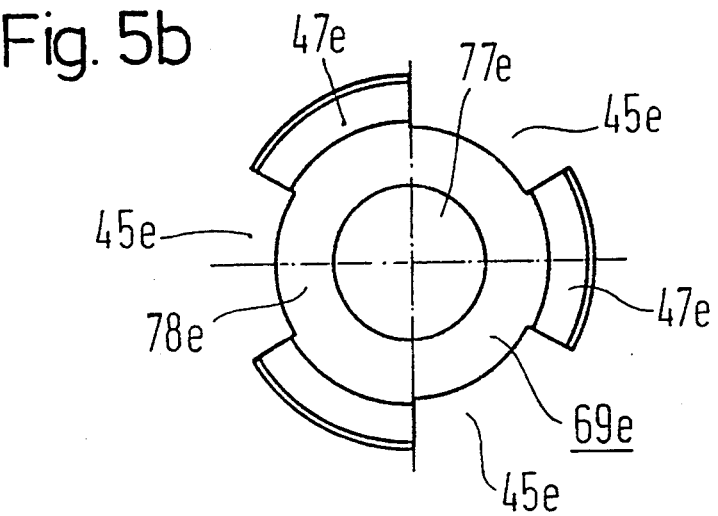

In the embodiment of FIGS. 5a and 5b, one can see a modified embodiment of the centering plate 69e. This centering plate 69e has adjacent its peripheral zone 78e centering flaps 39e for centering the centering plate 69e with respect to the bottom valve unit 13e and via the bottom valve unit 13e with respect to the pressure tube 7e. On the other hand, the centering flaps 39e have radially outwardly directed continuations 47e which engage the internal circumferential surface of the container tube 3e for centering the centering plate 69e with respect to the container tube 3e.

The flaps 39e are sections of a circumferential wall which is provided with passages 45e for the flow of damping liquid. This embodiment is preferred when large passages for the damping liquid are required.

Figure 6:
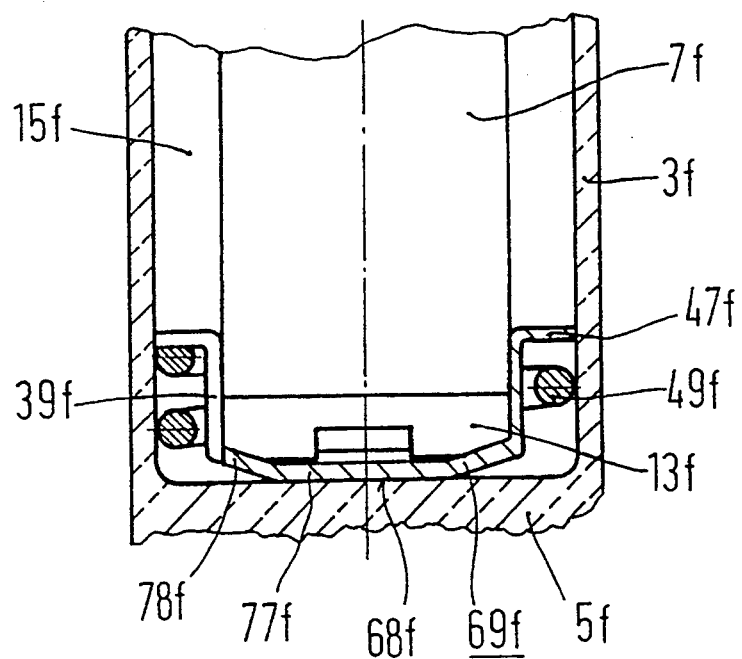
FIG. 6 shows a still further embodiment with a centering plate member at the lower end of the vibration damper unit and with an additional spring supporting this plate member.

In the embodiment of FIG. 6, one recognizes again a centering plate 69f with a central portion 77f and a peripheral portion 78f. The peripheral portion 78f is provided with centering flaps 39f centering the bottom valve unit 13f and the pressure tube 7f with respect to the centering plate 69f. The centering flaps 39f have radial continuations 47f. These radial continuations 47f center the centering plate 69f with respect to the container tube 3f. Moreover, a helical compression spring 49f is compressively engaged between the continuations 47f and the bottom unit 5f so that this compression spring 49f assists the resiliency function of the peripheral zone 78f.

Figure 8:
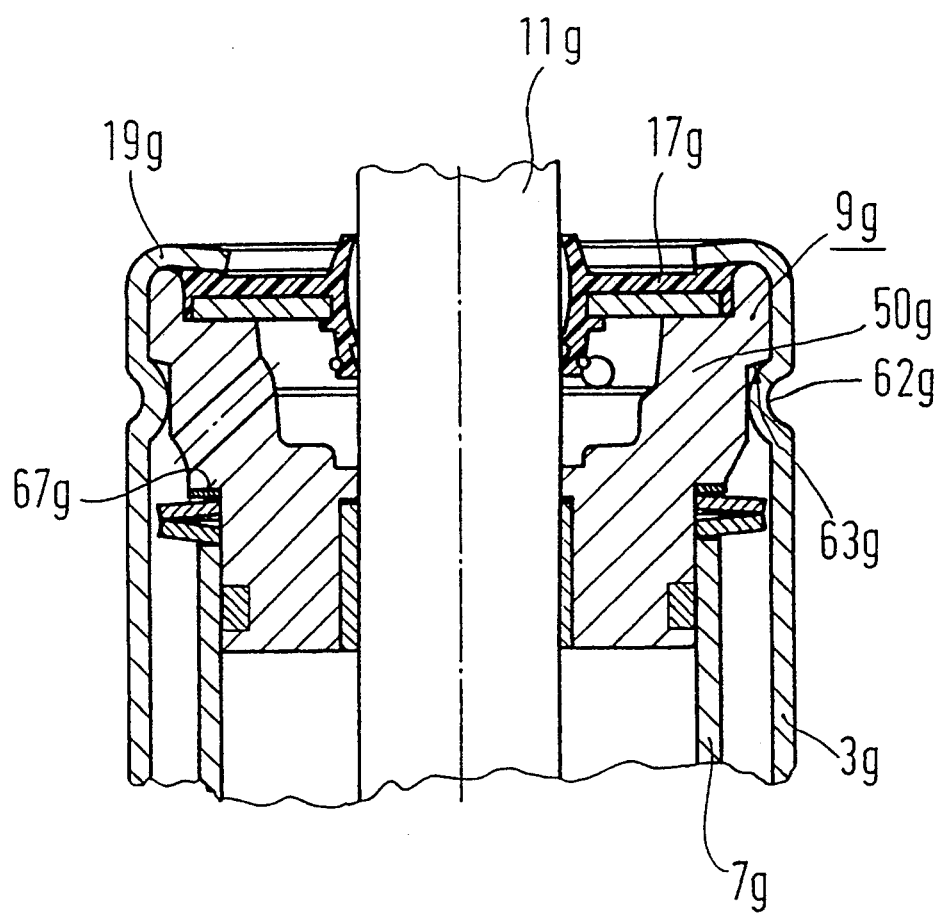
FIG. 8 shows a still further embodiment similar to the embodiment of FIG. 8.

The embodiment of FIG. 8 is very similar to the embodiment of FIGS. 1 and 7 already described. One can see that the annular check valve member 66a of FIG. 7 has been deleted such that the piston rod sealing and guiding means are reduced in axial height. The bead 62g engages behind a shoulder face 63g of the annular supporting and centering body 50g.

Figure 9:
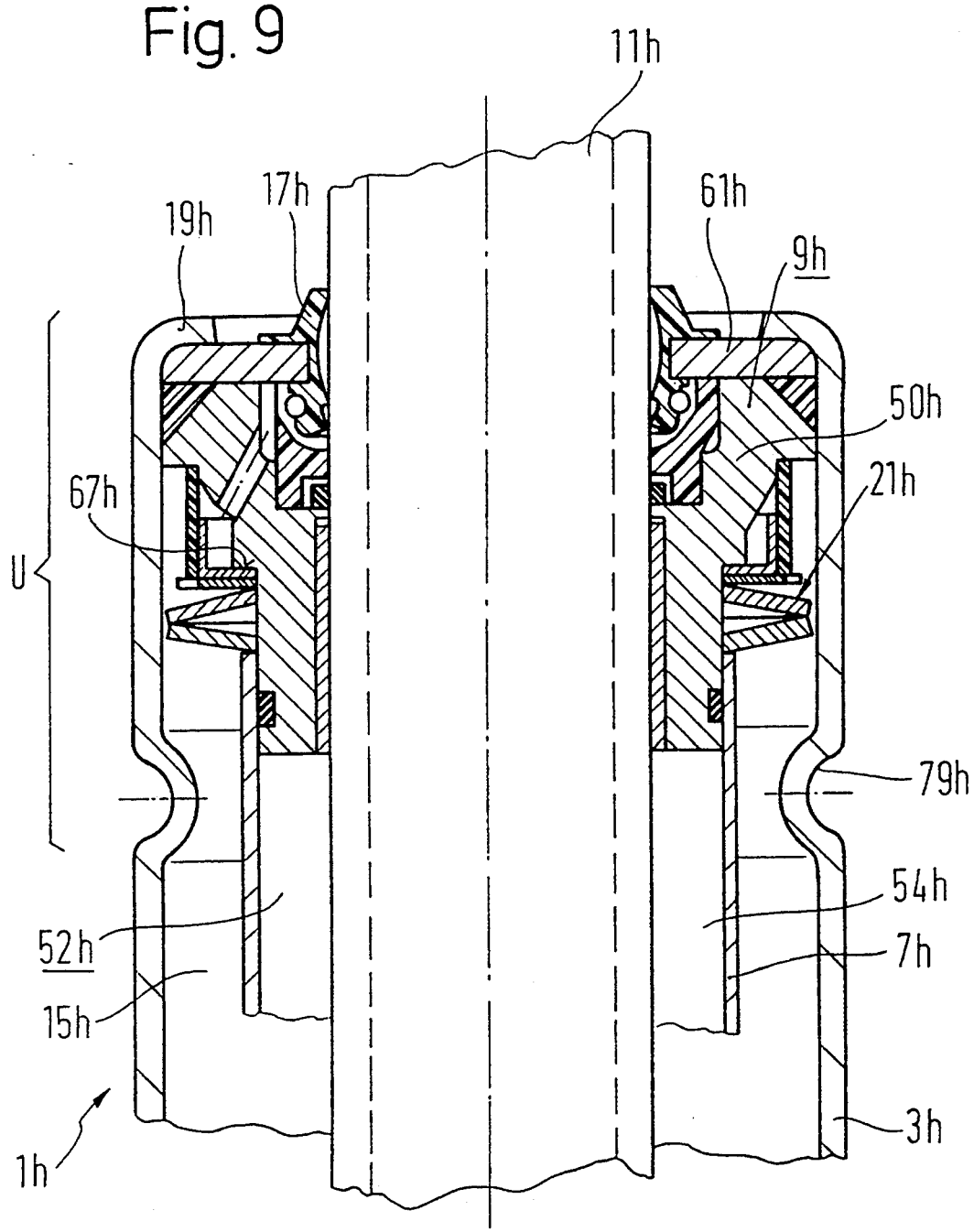
FIG. 9 shows a still further embodiment of the invention with a resilient circumferential fold provided in the container tube member.

In the embodiment of FIG. 9, the container tube member 3h is provided with a fold 79h which represents a further thermal length variation compensator unit besides the already described thermal length variation compensator unit 21h.

In this embodiment, the method of assembling is different with respect to the method of assembling described before in accordance with FIGS. 1 and 7. At the beginning of the assembling operation, the radially inwardly directed continuation 19h of the container tube 3h is still in alignment with the remainder of the tube. The vibration damper unit is again clamped within a clamping installation as described above, until the cup springs 21h are fully compressed into a substantially plane configuration. Then, the continuation 19h of the container tube 3h is radially inwardly bent such as to engage the disc 61h of the piston rod sealing unit 17h. The fold 79h may be shaped in the container tube 3h already before assembling. Alternatively, it may be shaped into the container tube 3h during assembling.

When in operation the operational temperature rises beyond the assembling temperature, the container tube 3h is lengthened more than the pressure tube 7h. This difference is compensated for by the cup springs 21h which change from the plane shape towards the shape as shown in FIG. 9. At lower operational temperatures below the assembling temperature, the container tube 3h is shortened more than the pressure tube 7h. Now, the fold 79h is straightened. Instead of the one fold 79h two or more folds may be provided. The radius and the elasticity of the folds 79h are selected such that at low temperatures there is again a reliable compensation.

One can see that at all temperatures within the operational range of temperature the pressure tube 7h is under compressional stress.

The embodiment of FIG. 10 shows again the use of a screw cap 75i similar to the embodiment of FIG. 3a in combination with cup springs 21i similar to the cup springs 21a of FIGS. 1 and 7. The screw cap is used in cases in which opening and re-closing of the vibration damper unit is desired.

Figure 11A:
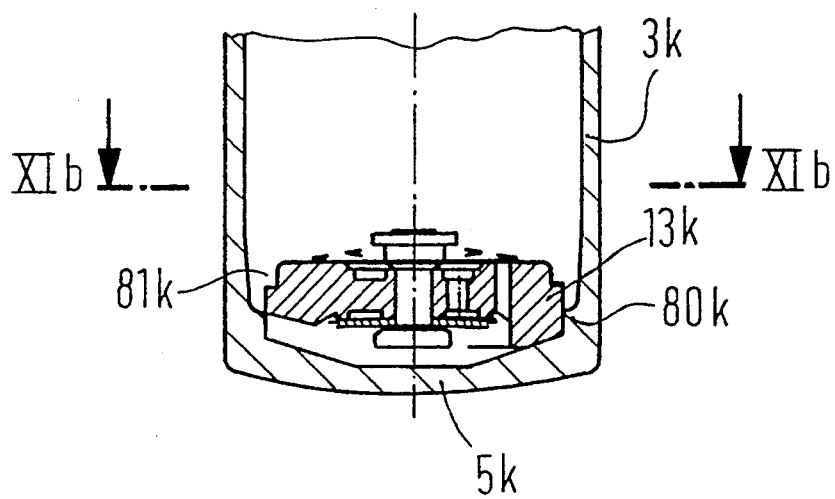
FIG. 11a shows the lower portion of a still further modified embodiment with a modified structure at the lower terminal area.
Figure 11B:
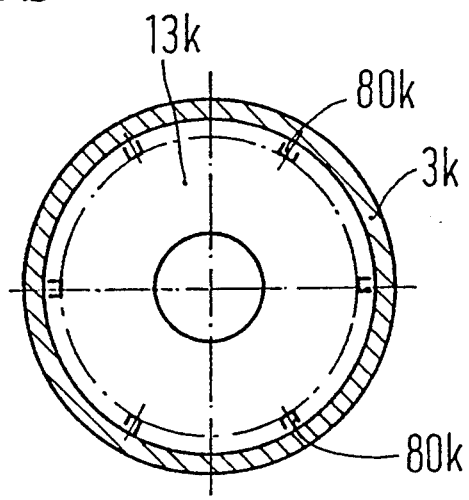

In FIGS. 11a and 11b there is shown a lower end portion of the vibration damper unit which may be combined e.g. with the upper portion as shown in FIGS. 1 and 7. There is no thermal length variation compensator unit provided at the lower end of the container tube 3k. The bottom valve unit 13k is centered within the container tube 3k by centering cams 80k. The thermal length variation compensator unit is only provided in the upper terminal area as shown in FIGS. 1 and 7 at 21a. One can see in FIG. 11a an annular recess 81k of the bottom valve unit 13k which is engaged with the pressure tube (not shown).

With respect to the cup springs, it is to be noted that there exists a plurality of combinations. One may arrange subsequent cup springs in the same direction or in opposite direction.

The embodiment with an elastic or elastomeric thermal expansion body provides a floating suspension of the pressure tube so that noises are suppressed.

In the embodiment of FIG. 1 there is warranted that the piston rod sealing unit 17 is always under a substantially constant axial stress between the radially inwardly bent portion 19a and the bead 62a.

In the embodiments of FIGS. 4a–4b and 5a–5b, the centering plate provides passages for flow of damping fluid between the lower working chamber and the compensation space.

It is to be noted that for analogous parts the same reference numerals have been used in the specification and that the various examples have been distinguished from each other by the indices a, b, c, d, e, f, g, h, i, k.

While specific embodiments of the invention have been shown and described in detail to illustrate the application of the inventive principles, it will be understood that the invention may be embodied otherwise without departing from said principles.

The reference numerals in the claims are only used for facilitating the understanding and are by no means restrictive.

What is claimed is:

1. A double tube vibration damper unit comprising:
   a pressure tube member having an axis and axially extending between a first terminal area and a second terminal area with a cavity being defined inside said pressure tube member axially between said first terminal area and said second terminal area;
   annular guiding and sealing means within said first terminal area;
   a piston rod member axially guided through said annular guiding and sealing means inward and outward of said cavity;
   a piston unit connected to said piston rod member inside said cavity, said piston unit separating within said cavity two working chambers from each other, namely a first working chamber nearer to said first terminal area and a second working chamber nearer to said second terminal area;
   said first and second working chambers being interconnectable with each other for damping fluid flow through piston bridging valve means;
   said second working chamber being confined adjacent said second terminal area by a bottom valve unit;
   said pressure tube member being surrounded by a container tube member substantially coaxial with said pressure tube member and axially extending between said first terminal area and said second terminal area;
   a compensation space being confined radially between said pressure tube member and said container tube member;

said second working chamber and said compensation space being interconnectable with each other for damping fluid flow through bottom valve means of said bottom valve unit;

said annular guiding and sealing means comprising an annular supporting unit, said annular supporting unit being adapted for axially supporting said pressure tube member and said container tube member with respect to each other;

said container tube member being provided with a bottom unit in said second terminal area, said bottom unit being adapted for axially supporting said pressure tube member and said container tube member with respect to each other;

said annular supporting unit being axially secured with respect to said container tube member in at least one axial direction against movement with respect to said container tube member and being provided with first pressure tube supporting means;

said bottom unit being axially secured with respect to said container tube member in at least one axial direction against movement with respect to said container tube member and being provided with second pressure tube supporting means;

at least one thermal length variation compensator unit disposed axially adjacent said pressure tube member axially adjacent one of and said first and second terminal areas of said pressure tube member;

said at least one thermal length variation compensator unit comprising means for compensating for length variations between the length of said container tube member and the length of said pressure tube member during relative expansion and contraction between said container tube member and said pressure tube member in an axial direction; and said at least one thermal length variation compensator unit comprising means for providing an axial force to said pressure tube member with respect to said container tube member to permit relative axial movement between at least a portion of said pressure tube member and at least a portion of said container tube member within a predetermined operational range of temperature.

2. A double tube vibration damper unit as set forth in claim 1, said first and second pressure tube supporting means being oppositely directed towards each other, said thermal length variation compensation unit being axially compressed between said annular guiding and sealing means and said pressure tube member to provide said axial force.

3. A double tube vibration damper unit as set forth in claim 1, said annular supporting unit being an annular supporting and centering unit centering said pressure tube member with respect to said container tube member.

4. A double tube vibration damper unit as set forth in claim 3, said annular supporting and centering unit being adapted for centering said piston rod member with respect to both said pressure tube member and said container tube member.

5. A double tube vibration damper unit as set forth in claim 1, said bottom unit being adapted for both axially supporting and radially centering said pressure tube member with respect to said container tube member.

6. A double tube vibration damper unit as set forth in claim 1, said annular supporting unit comprising an annular supporting and centering body adapted for centering said pressure tube member, said container tube member and said piston rod member with respect to each other, said annular supporting and centering body comprising a first surface disposed to and contacting said container tube member, and a second surface disposed about and contacting said piston rod member to guide movement of said piston rod member and provide a seal around said piston rod member.

7. A double tube vibration damper unit as set forth in claim 1, said annular supporting unit carrying at least one of first working cheer sealing means and compensation space sealing means.

8. A double tube vibration damper unit as set forth in claim 1, said pressure tube member being adjacent said first terminal area in an axially overlapping relationship with a circumferential centering face of said supporting unit, a sealing ring member being provided within a circumferential groove of said circumferential centering face and being sealingly engaged with said pressure tube member.

9. A double tube vibration damper unit as set forth in claim 1, said pressure tube member being axially supported by said bottom unit through a force transmitting portion of said bottom valve unit.

10. A double tube vibration damper unit as set forth in claim 1, a further thermal length variation compensator unit being provided inside or in series with said container tube member.

11. A double tube vibration damper unit as set forth in claim 10, one of said thermal length variation compensator unit and said further thermal length variation compensator unit being subject to compressional stress and the other one being subject to tractional stress, both said thermal length variation compensator units being under prestress within said predetermined operational range of temperature.

12. A double tube vibration damper unit as set forth in claim 11, said further thermal length variation compensator unit being provided by at least one circumferential fold structure of said container tube member.

13. A double tube vibration damper unit as set forth in claim 12, said fold structure being a radially inwardly directed wave-shaped fold structure.

14. A double tube vibration damper unit as set forth in claim 1, said thermal length variation compensator unit being provided adjacent the first terminal area.

15. A double tube vibration damper unit as set forth in claim 1, said thermal length variation compensator unit being provided adjacent said second terminal area.

16. A double tube vibration damper unit as set forth in claim 1, said pressure tube member and said container tube member being made of materials having different thermal length variation coefficients.

17. A double tube vibration damper unit as set forth in claim 16, said container tube member having a larger thermal length variation coefficient than said pressure tube member.

18. A double tube vibration damper unit as set forth in claim 16, said pressure tube member being made of steel.

19. A double tube vibration damper unit as set forth in claim 16, said container tube member being made of a light metal, said light metal comprising aluminum.

20. A double tube vibration damper unit as set forth in claim 1, said thermal length variation compensator unit comprising one of:
   at least one cup spring, and
   at least one pair of cup springs.

21. A double tube vibration damper unit as set forth in claim 20, said cup springs of said at least one pair of cup springs having radially inner edges spaced axially from each other, the radially inner edge of one of said cup springs acting axially onto a first end of said pressure tube member, the radially inner edge of the other cup spring acting axially onto said first pressure tube supporting means.

22. A double tube vibration damper unit as set forth in claim 1, said thermal length variation compensator unit comprising an annular compensator body having an axial width variable in response to temperature, the width variation of said annular compensator body being related to different coefficients of thermal length variation of said pressure tube member and said container tube member such that within the predetermined operational range of temperature a difference of length variation between said pressure tube member and said container tube member is approximately compensated for the variation of the axial width of said annular compensator body.

23. A double tube vibration damper unit as set forth in claim 22, said annular compensator body being made of one of:
an elastic material, and
an elastomeric material.

24. A double tube vibration damper unit as set forth in claim 22, said annular compensator body being limited in radial dimension by radial confining means.

25. A double tube vibration damper unit as set forth in claim 22, said annular compensator body being located axially between a first end of said pressure tube member and said first pressure tube supporting means.

26. A double tube vibration damper unit as set forth in claim 25, said first pressure tube supporting means being provided by a substantially radially extending shoulder face of said annular supporting unit, said shoulder face being provided with an annular recess, said annular compensator body being partially received by said annular recess and acting onto said first end of said pressure tube member through an annular force transmission disc.

27. A double tube vibration damper unit as set forth in claim 25, said annular compensator body being accommodated within a substantially L-shaped confining ring member, said confining ring member having a bottom portion included within said series arrangement and a wall portion radially adjacent to said annular compensator body.

28. A double tube vibration damper unit as set forth in claim 27, said annular compensator body being positioned in axial direction between said bottom portion which is axially adjacent said first end of said pressure tube member and an annular force transmitting disc axially supported by said first pressure tube supporting means.

29. A double tube vibration damper unit as set forth in claim 1, said annular supporting unit comprising a plurality of guiding and sealing components, said guiding and sealing components being positioned with respect to each other by securing means securing said container tube member with respect to said annular supporting unit.

30. A double tube vibration damper unit as set forth in claim 1, said container tube member being axially fixed with respect to said annular supporting unit in opposite axial directions.

31. A double tube vibration damper unit as set forth in claim 30, said container tube member having a first end portion surrounding an annular supporting and centering body of said annular supporting unit, said annular supporting and centering body having a circumferential face and a terminal face remote from said cavity, said end portion of said container tube member having a radially inwardly bent continuation overlying said terminal face of said annular supporting and centering body, said circumferential face of said annular supporting and centering body being in beading engagement with said end portion of said container tube member.

32. A double tube vibration damper unit as set forth in claim 30, said annular supporting unit comprising an annular supporting and centering body, said annular supporting and centering body being in engagement with an internal shoulder face of said container tube member, which shoulder face is substantially axially directed away from said cavity, a screw cap being screwed onto a first end portion of said container tube member, said screw cap having a circumferential wall in threaded engagement with external thread means of said container tube member and an end wall overlying a terminal face of said annular supporting and centering body remote from said cavity.

33. A double tube vibration damper unit as set forth in claim 1, said pressure tube member being supported by said second pressure tube supporting means through said at least one thermal length variation compensator unit.

34. A double tube vibration damper unit as set forth in claim 33, said thermal length variation compensator unit comprising a centering plate member, said centering plate member having a central zone supported by said second pressure tube supporting means, and a peripheral zone axially resilient with respect to said central zone, said pressure tube member being supported in axial direction by said peripheral zone.

35. A double tube vibration damper unit as set forth in claim 34, said pressure tube member being supported by said peripheral zone through said bottom valve unit.

36. A double tube vibration damper unit as set forth in claim 34, said peripheral zone being within said operational range of temperature free of axial support by said bottom unit and said pressure tube member being within said operational range of temperature free of axial support by said central zone.

37. A double tube vibration damper unit as set forth in claim 34, said peripheral zone being provided alternatingly with centering flaps for centering said pressure tube member with respect to said centering plate member and with lateral positioning flaps for centering said centering plate member with respect to said container tube member.

38. A double tube vibration damper unit as set forth in claim 34, said peripheral zone being provided with angularly spaced centering flaps for centering said pressure tube member with respect to said centering plate member, said centering flaps being provided with continuations for centering said centering plate member with respect to said container tube member.

39. A double tube vibration damper unit as set forth in claim 34, said peripheral zone being provided with lateral extensions, said lateral extensions being supported by spring means or additional spring means.

40. A double tube vibration damper unit as set forth in claim 1, said bottom unit of said container tube member being provided with centering cam means for centering said pressure tube member with respect to said container tube member.

41. A double tube vibration damper unit as set forth in claim 1, said at least one thermal length variation compensator unit having within a predetermined operational range of temperature an axial stress exceeding a predetermined minimum value.

42. A double tube vibration damper unit as set forth in claim 41, said axial force provided by said at least one thermal length variation compensator unit being responsible for maintaining a sealing function of said annular guiding and sealing means, said minimum value being such as to maintain said sealing function throughout said predetermined operational range of temperature.

43. A double tube vibration damper unit as set forth in claim 41, said axial force provided by said at least one thermal length variation compensator unit being responsible for maintaining the sealing condition of said piston rod guiding and sealing means said minimum value being such as to maintain said sealing condition throughout said predetermined operational range of temperature.

44. A method for assembling a double tube vibration damper unit, said double tube vibration damper unit comprising a pressure tube member having an axis and axially extending between a first terminal area and a second terminal area with a cavity being defined inside said pressure tube member axially between said first terminal area and said second terminal area, annular guiding and sealing means within said first terminal area, a piston rod member axially guided through said annular guiding and sealing means inward and outward of said cavity, a piston unit connected to said piston rod member inside said cavity, said piston unit separating within said cavity two working chambers from each other, namely a first working chamber nearer to said first terminal area and a second working chamber nearer to said second terminal area, said first and second working chambers being interconnectable with each other for damping fluid flow through piston bridging valve means, said second working chamber being confined adjacent said second terminal area by a bottom valve unit, said pressure tube member being surrounded by a container tube member substantially coaxial with said pressure tube member and axially extending between said first terminal area and said second terminal area, a compensation space being confined radially between said pressure tube member and said container tube member, said second working chamber and said compensation space being interconnectable with each other for damping fluid flow through bottom valve means of said bottom valve unit, said annular guiding and sealing means comprising an annular supporting unit said annular supporting unit being adapted for axially supporting said pressure tube member and said container tube member with respect to each other, said container tube member being provided with a bottom unit in said second terminal area, said bottom unit being adapted for axially supporting said pressure tube member and said container tube member with respect to each other, said annular supporting unit being axially secured with respect to said container tube member in at least one axial direction against movement with respect to said container tube member and being provided with first pressure tube supporting means, said bottom unit being axially secured with respect to said container tube member in at least one axial direction against movement with respect to said container tube member and being provided with second pressure tube supporting means, said pressure tube member being arranged in a series arrangement with at least one thermal length variation compensator unit, said series arrangement being located axially between both said first and said second pressure tube supporting means, said series arrangement being under axial stress of constant direction within a predetermined operational range of temperature, said method comprising axially adjusting by an external adjusting force said annular supporting unit with respect to said container tube member against a resilient action of said thermal length variation compensator unit until achieving an axial boundary position of said annular supporting unit with respect to said container tube member corresponding to a maximum stress of said thermal length variation compensator unit, allowing said annular supporting unit to return from said axial boundary position towards a securing position with respect to said container tube member, said securing position being spaced from said boundary position by a predetermined return path value d, and thereupon securing said annular supporting unit with respect to said container tube member.

45. A method for assembling a double tube vibration damper unit, said double tube vibration damper unit comprising a pressure tube member having an axis and axially extending between a first terminal area and a second terminal area with a cavity being defined inside said pressure tube member axially between said first terminal area and said second terminal area, annular guiding and sealing means within said first terminal area, a piston rod member axially guided through said annular guiding and sealing means inward and outward of said cavity, a piston unit connected to said piston rod member inside said cavity said piston unit separating within said cavity two working chambers from each other, namely a first working chamber nearer to said first terminal area and a second working chamber nearer to said second terminal area, said first end second working chamber being interconnectable with each other for damping fluid flow through piston bridging valve means, said second working chamber being confined adjacent said second terminal area by a bottom valve unit said pressure tube member being surrounded by a container tube member substantially coaxial with said pressure tube member and axially extending between said first terminal area and said second terminal area, a compensation space being confined radially between said pressure tube member and said container tube member, said second working chamber and said compensation space being interconnectable with each other for damping fluid flow through bottom valve means of said bottom valve unit, said annular guiding and sealing means comprising an annular supporting unit, said annular supporting unit being adapted for axially supporting said pressure tube member and said container tube member with respect to each other, said container tube member being provided with a bottom unit in said second terminal area, said bottom unit being adapted for axially supporting said pressure tube member and said container tube member with respect to each other, said annular supporting unit being axially secured with respect to said container tube member in at least one axial direction against movement with respect to said container tube member and being provided with first pressure tube supporting means, said bottom unit being axially secured with respect to said container tube member in at least one axial direction against movement with respect to said container tube member and being provided with second pressure tube supporting means, said pressure tube member being arranged in a series arrangement with at least one thermal length variation compensator unit, said series arrangement being located axially between both said first and said second pressure tube supporting means, said series arrangement being under axial stress of constant direction within a predetermined operational range of temperature, said container tube member being provided with a circumferential lengthening fold, said circumferential lengthening fold allowing in operation resilient axial lengthening of the container tube member after said at least one thermal length variation compensator unit has been deformed to a maximum value, said method comprising axially adjusting by an external adjusting force said annular supporting unit with respect to said container tube member against a resilient action of said themal length variation compensator unit until achieving an axial boundary position of said annular supporting unit with respect to said container tube member corresponding to a maximum deformation of said thermal length variation compensator unit, and thereupon securing said annular supporting unit with respect to said container tube member.

46. A method as set forth in claim 44 or 45, said securing being performed by bending an end portion of said container tube member into engagement with a terminal face of said annular supporting unit and providing a bead engagement between said container tube member and a circumferential face of said annular supporting unit.

* * * * *

UNITED STATES PATENT AND TRADEMARK OFFICE
CERTIFICATE OF CORRECTION

PATENT NO. : 5,441,132
DATED : August 15, 1995
INVENTOR(S) : Robert PRADEL and Stefan SCHIFFLER It is certified that error appears in the above-indentified patent and that said Letters Patent is hereby corrected as shown below:

In column 16, line 11, Claim 7, after 'working', delete "cheer" and insert --chamber--.

In column 20, line 40, Claim 45, after 'first', delete "end" and insert --and--.

Signed and Sealed this

Nineteenth Day of November, 1996

Attest:

BRUCE LEHMAN

Attesting Officer     Commissioner of Patents and Trademarks